(12) United States Patent
Katsui et al.

(10) Patent No.: US 6,333,847 B1
(45) Date of Patent: Dec. 25, 2001

(54) OUTSIDE PANEL FOR AN ELECTRONIC DEVICE

(75) Inventors: Tadashi Katsui; Haruhiko Yamamoto, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,478

(22) Filed: Feb. 2, 1999

(30) Foreign Application Priority Data

Feb. 4, 1998 (JP) .................................................. 10-023160

(51) Int. Cl.⁷ .............................. H02B 1/04; H05K 7/20
(52) U.S. Cl. ........................... 361/679; 361/625; 361/687
(58) Field of Search .................................. 165/80.3, 122, 165/908, 135; 415/208.1; 62/265; 454/184; 361/701, 687–690, 696, 692–695, 625, 699, 683, 627, 679

(56) References Cited

U.S. PATENT DOCUMENTS

| | | | |
|---|---|---|---|
| 4,084,213 | * | 4/1978 | Kirchner . |
| 4,325,229 | * | 4/1982 | De Zurik . |
| 4,359,085 | * | 11/1982 | Mueller . |
| 4,674,004 | * | 6/1987 | Smith . |
| 4,936,682 | * | 6/1990 | Hoyt . |
| 5,107,649 | * | 4/1992 | Benson . |
| 5,270,572 | * | 12/1993 | Nakajima . |
| 5,361,188 | * | 11/1994 | Kondou . |
| 5,363,654 | * | 11/1994 | Lee . |
| 5,467,250 | * | 11/1995 | Howard . |
| 5,576,932 | * | 11/1996 | Bishop . |
| 5,586,004 | * | 12/1996 | Green . |
| 5,666,261 | * | 9/1997 | Aguilera . |
| 5,705,850 | * | 1/1998 | Ashiwake . |
| 5,727,618 | * | 3/1998 | Mundinger . |
| 5,774,334 | * | 6/1998 | Kawamura . |
| 5,851,143 | * | 12/1998 | Hamid . |
| 5,854,739 | * | 12/1998 | Steiner . |
| 5,876,280 | * | 3/1999 | Kitano . |
| 5,915,466 | * | 6/1999 | Aakalu . |
| 5,940,288 | * | 8/1999 | Kociecki . |
| 5,953,206 | * | 9/1999 | Jondrow . |
| 5,957,194 | * | 9/1999 | Azar . |
| 5,982,617 | * | 11/1999 | Haley . |
| 6,023,410 | * | 2/2000 | Chu . |

FOREIGN PATENT DOCUMENTS

| | | | | |
|---|---|---|---|---|
| 128584 | * | 10/1979 | (JP) | ..................................... 361/700 |
| 62-39098 | | 2/1987 | (JP) | . |
| 63-108800 | | 5/1988 | (JP) | . |
| 63-153924 | | 6/1988 | (JP) | . |
| 5-298961 | | 11/1993 | (JP) | . |
| 8-76892 | | 3/1996 | (JP) | . |
| 8-204373 | * | 9/1996 | (JP) | ..................................... 361/700 |
| 9-18650 | | 1/1997 | (JP) | . |
| 86/05942 | * | 10/1986 | (WO) | ..................................... 361/700 |

* cited by examiner

*Primary Examiner*—Gerald Tolin
(74) *Attorney, Agent, or Firm*—Armstrong, Westerman, Hattori, McLeland & Naughton, LLP

(57) ABSTRACT

To prevent an operator from being hurt by a hot outside panel of an electronic device when he touches the outside panel with his hand or a portion of his body, the outside panel is improved and an electronic device safe for the operator is provided. There are provided spaces for heat insulation in an outside panel and, by the action of the spaces, the apparent temperature of the outside panel is decreased. Also, ducts are provided in the outside panel, and the temperature of the outside panel itself is decreased by the action of the ducts. Further, a large number of protrusions are provided on the surface of the outside panel, and a heat insulating section is formed at the forward end of each protrusion, so that the apparent temperature is decreased.

1 Claim, 7 Drawing Sheets

OUTSIDE PANEL FOR AN ELECTRONIC DEVICE

BACKGROUND OF THE INVENTION

1. Field of the Invention

The present invention relates to a structure of an outside panel of an electronic device.

2. Description of the Related Art In the field of electronic devices, especially in the field of portable type electronic information devices (for example, notebook type personal computers), the sizes of the electronic devices have been reduced, the functions have been highly enhanced, and the processing speeds have been greatly increased. Accordingly, a large number of parts, which generate large quantities of heat, are mounted in the electronic devices and the temperatures in the electronic devices are generally very high.

In order to effectively emit the heat generated in the devices to the outside, various investigations and a large number of suggestions have been made.

For example, Japanese Unexamined Patent Publication No. 63-153924 discloses a structure in which protrusions and recesses are formed on the overall surface of a casing, so that heat can be emitted from the surface of the casing.

However, when the structure disclosed in the above patent publication is adopted, it is estimated that the temperature on the surface (heat radiating surface) of the casing will become very high.

In this case, when an operator touches the surface of the casing with his hand or with a portion of his body, there is a possibility that the operator may be hurt.

In Japanese Patent Application No. 8-270245, from the present applicant, the heat emitting section, the a temperature of which might become high, is arranged in a hinge portion of a notebook type personal computer. That is, the heat emitting section is located at a position in the personal computer which cannot be touched or is difficult for an operator to touch. However, when a position at which the heat emitting section is arranged is restricted, it becomes difficult to emit heat effectively when the heating amount is increased.

SUMMARY OF THE INVENTION

According to the present invention, the above conventional problems are solved by making improvements for the outside panel (casing) of an electronic device. It is a task of the present invention to provide an outside panel structure of an electronic device which is safe for an operator.

The first embodiment of the present invention provides an electronic device comprising an outside panel which includes a plurality of independent spaces for thermal insulation regularly arranged in the outside panel in parallel to each other. Temperature of the outer surface of the outside panel is decreased by the heat insulating action of the spaces. Therefore, the apparent temperature of the outside panel is decreased.

The second embodiment of the present invention provides an electronic device comprising an outside panel which includes a plurality of ducts arranged in the outside panel in parallel to each other, wherein the plurality of ducts are partitioned from each other by partition walls. The temperature of the outside panel is substantially decreased by the action of the ducts. Therefore, the outer surface temperature (apparent temperature) is decreased.

The third embodiment of the present invention provides an electronic device comprising an outside panel which includes a plurality of protrusions arranged on an external surface of the outside panel, wherein a forward end portion of each protrusion is composed of a thermally insulating section made of thermally insulating material. Due to the above arrangement, a contact area of an operator with respect to the outside panel is substantially decreased. Also, due to the existence of the heat insulating sections arranged at the end portions of the protrusions, the apparent temperature of the outside panel is decreased.

The fourth embodiment of the present invention provides an electronic device comprising an outside panel, wherein a high temperature zone is provided in a region in the device corresponding to a predetermined portion of the outside panel which is difficult for an operator to touch, and parts generating a large quantity of heat are collected and mounted in the high temperature zone. The temperature of a region in the device corresponding to a portion of the outside panel which can be easily touched by an operator is relatively decreased. Therefore, the outer surface temperature (apparent temperature) of a portion of the outside panel, which is easily contacted by the operator, is decreased.

The fifth embodiment of the present invention provides an electronic device comprising an outside panel, wherein a thermal insulating layer is formed on an outer surface of the outside panel. Since the heat insulating layer is provided, the apparent temperature with respect to the outside panel is decreased.

The sixth embodiment of the present invention provides an electronic device comprising: an outside panel; and a pressure generating unit for keeping the inside of the device at high pressure, wherein the outside panel is provided with a plurality of holes, and air inside of the device is jetted out from the holes. When the air is jetted out from the holes, the outer surface temperature of the outside panel is decreased.

BRIEF DESCRIPTION OF THE DRAWINGS

These and other objects of the present invention will become apparent from the following detailed description of the preferred embodiment of the invention, taken in connection with the accompanying drawings.

In the drawings.

Referring to the accompanying drawings, a plurality of embodiments of the present invention will be explained as follows. In this connection, like reference characters designate the same or similar parts throughout the several embodiments, and duplicate explanations are appropriately omitted here.

First Embodiment

Figure 1:
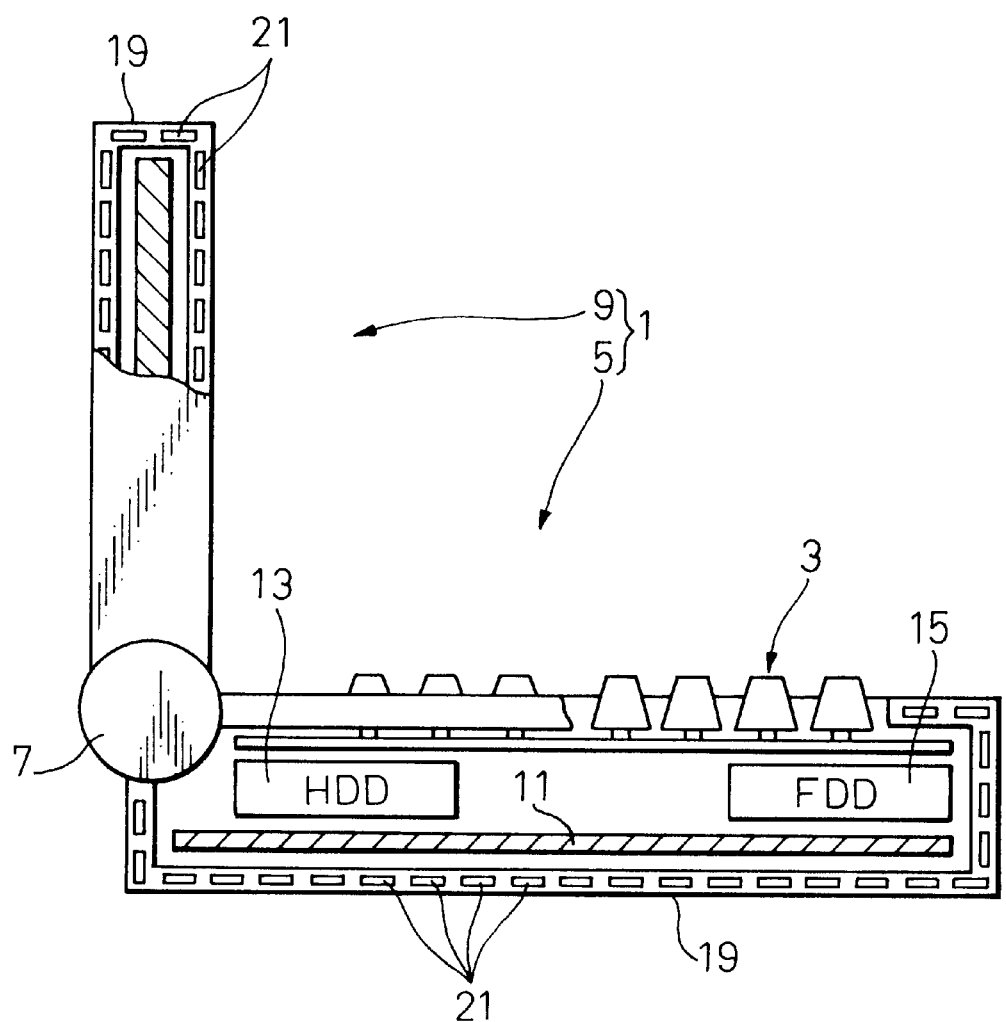
FIG. 1 is a cross-sectional side view of the electronic device of the first embodiment of the present invention.

Reference is made to FIG. 1 showing the first embodiment of the present invention. The electronic device 1 (for example, a notebook type personal computer) shown in the drawing includes: a main body 5, onto the upper surface of which the key board 3 is mounted; and a liquid crystal display (LCD) 9 pivotally connected to the main body 5 via the hinge portion 7 arranged on the back side (on the left in the drawing) of the main body 5.

The main board 11 is arranged in the inner bottom portion of the main body 5, and the hard disk drive (HDD) 13 and the floppy disk drive (FDD) 15 are incorporated onto the side of the main body 5.

Figure 2:
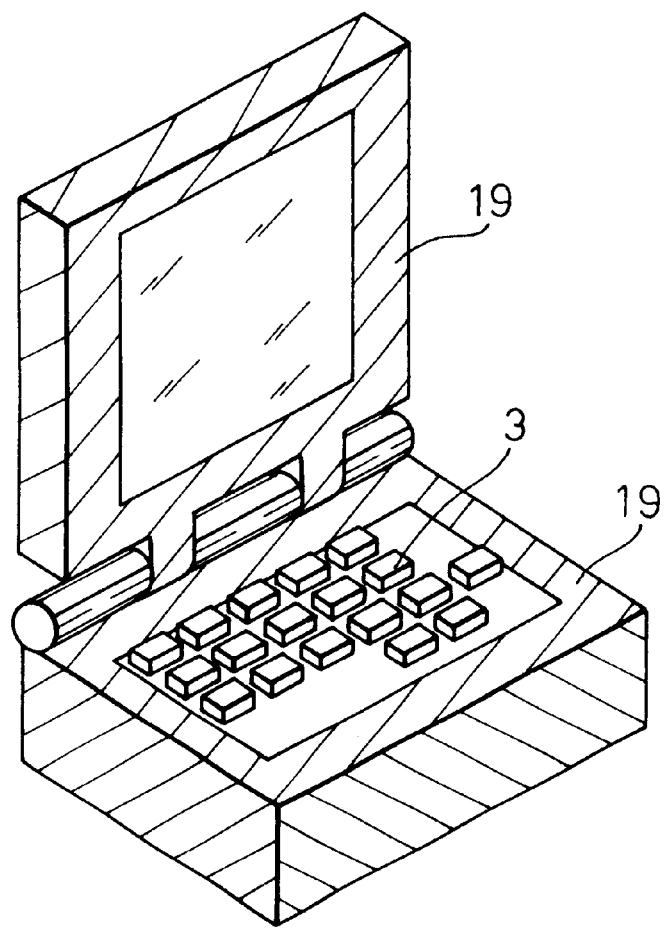
FIG. 2 is a perspective view of the electronic device shown in FIG. 1.

As shown by the hatched lines in FIG. 2, the liquid crystal display 9 (except for the display surface) and the main body 5 (except for the keyboard 3) are covered with the outside panel 19 made of a predetermined resin member. The predetermined resin member is preferably made of material with high heat conduction.

In the outside panel 19, there are provided a plurality of plate-shaped independent spaces 21 which are regularly arranged in parallel to each other. Each space 21 encloses a gas (for example, air).

In this first embodiment, the spaces 21 formed in the outside panel 19 exhibit the function of heat insulation. Therefore, it is difficult to conduct heat generated in the main body 5 to the outer surface of the main body 5 (outside panel 19). That is, it is possible to decrease the apparent temperature of the outside panel 19. Due to the foregoing, it is possible for an operator to operate the electronic device comfortably.

Figure 3:
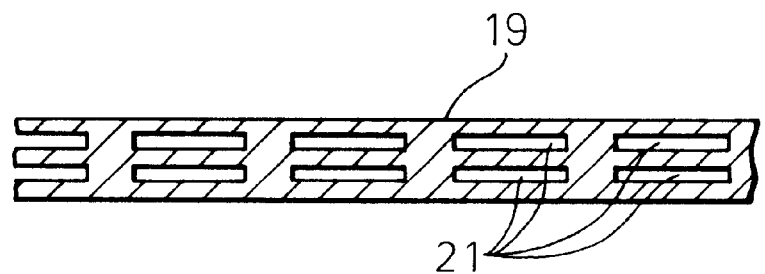
FIG. 3 is a cross-sectional side view showing a primary portion of another example of the outside panel shown in FIG. 1.

In this connection, in order to provide a higher performance of heat insulation, it is possible to adopt a two layer structure in which the spaces 21 formed in the outside panel 19 are arranged in the upper and the lower portion of the outside panel 19 as shown in FIG. 3. Alternatively, it is possible to adopt a multiple layer structure (not shown) in which the multiple layers of ducts, the number of which is not less than three, are formed in the upper and the lower portion of the outside panel.

Second Embodiment

Figure 4:
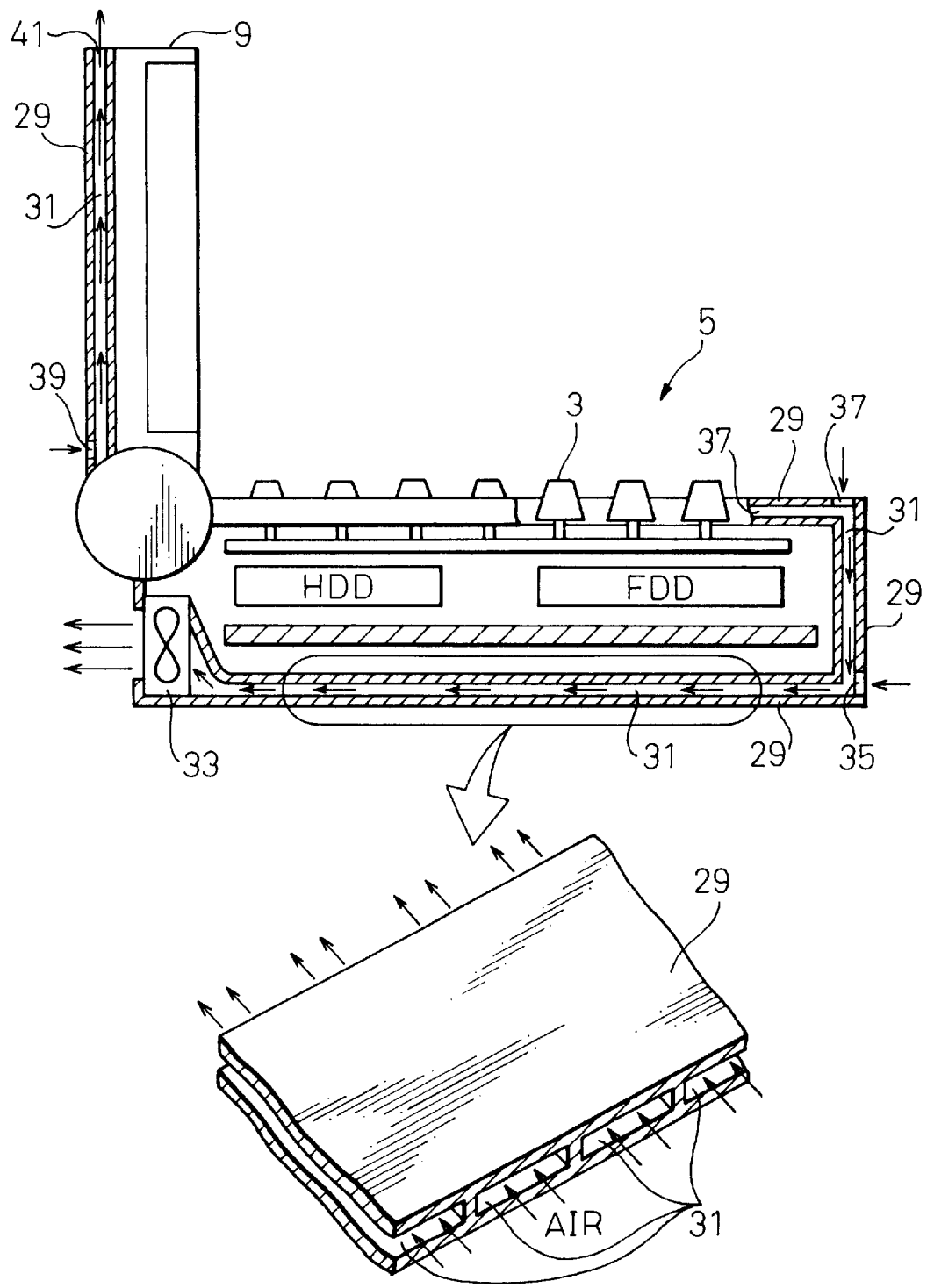
FIG. 4 is a cross-sectional side view of the electronic device of the second embodiment of the present invention.

Reference is made to FIG. 4 showing the second embodiment. The outside panel 29, which covers the liquid crystal display 9 (except for the display surface) and the main body 5 (except for the key board 3), is made of the same material as that of the outside panel 19 of the first embodiment described above, however, the structure is different. That is, the bottom portion of the main body of the outside panel 21 has a plurality of ducts 31 which are partitioned by the partition walls and arranged in parallel to each other.

At the rear of the main body located on the downstream side of the ducts, there is provided a suction type exhaust unit 33. For example, there is provided a fan. In the front of the main body located on the upstream side of the ducts, there is provided an air intake 35.

In the outside panel 29 located in the front of the main body, there are provided a plurality of ducts 31 which are extended in the upward and the downward direction and arranged in parallel to each other. Each duct 31 is communicated with the duct 31 of the outside panel 29 arranged in the bottom portion of the main body. In the upper portion and in the periphery of the key board, there are provided air intakes 37.

In the outside panel 29 of the liquid crystal display 9, there are provided a plurality of ducts 31 used for natural air-cooling, which are arranged in parallel to each other being extended in the upward and downward direction. At the lower portion of each duct, there is provided an air intake 39. At the upper portion of each duct 31, there is provided an air exhaust port 41.

In this second embodiment, heat generated in the main body 5 can be effectively discharged outside from the ducts 31 formed in the outside panel 29 of the main body 5. Therefore, heat is seldom conducted to the outer surface of the outside panel 29. That is, it is possible to decrease the apparent temperature of the outside panel 29. Due to the foregoing, it is possible for an operator to operate the electronic device comfortably.

Figure 5:
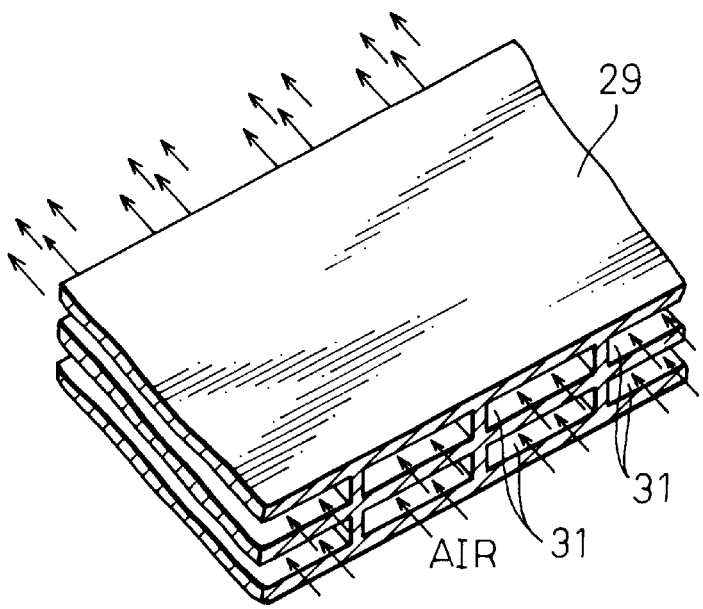
FIG. 5 is a perspective view showing a primary portion of the outside panel shown in FIG. 4.

In this connection, in order to provide a higher performance of heat insulation, it is possible to adopt a two layer structure in which the ducts 31 formed in the outside panel 29 are arranged in the upper and the lower portion of the outside panel as shown in FIG. 5. Alternatively, it is possible to adopt a multiple layer structure (not shown) in which the multiple layers of ducts, the number of which is not less than three, are formed in the upper and the lower portion of the outside panel.

Although not shown in the drawing, in addition to the above heat transmission system, it is possible to arrange another heat transmission system including: a heat collecting section for collecting heat generated in the main body; a heat radiating section for radiating heat from the liquid crystal display; and a heat pipe for connecting the heat collecting section with the heat radiating section. It is possible to compose the device in such a manner that heat is radiated into the ducts of the outside panel in the liquid crystal display section by this heat radiating section.

Third Embodiment

Figure 6:
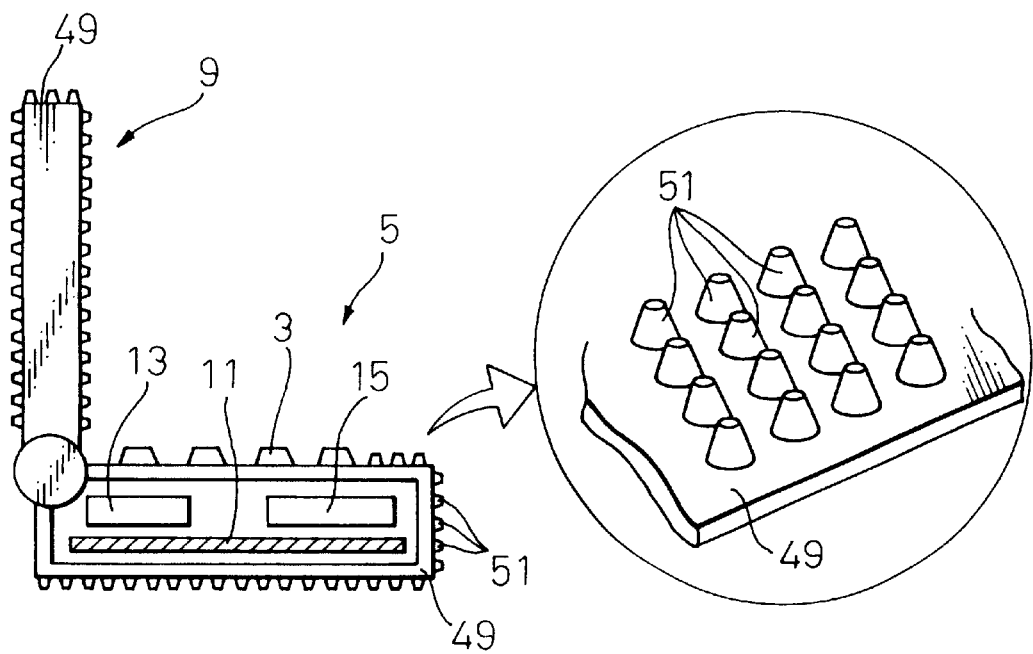
FIG. 6 is a cross-sectional side view of the electronic device of the third embodiment.

Reference is made to FIG. 6 showing the third embodiment. The outside panel 49, which covers the liquid crystal display 9 (except for the display surface) and the main body 5 (except for the key board 3), is made of the same material as that of the outside panels of the first and the second embodiment described above, however, the structure is different. That is, these outside panels 49 are made of material having a high heat conductivity, and the outer surfaces are provided with a plurality of circular truncated cone protrusions 51 which are regularly arranged.

A forward end portion of the protrusion 51, the length of which is approximately 0.5 mm, is referred to as a touched region with which an operator's hand or a portion of the operator's body actually comes into contact. Therefore, this touched region is subjected to heat insulation treatment. Specific examples of heat insulation treatment are: treatment of coating the touched region with appropriate heat insulation material such as resin or paint; and treatment of metallic vapor deposition. When this heat insulation treatment is performed, heat is hardly conducted.

Figure 7:
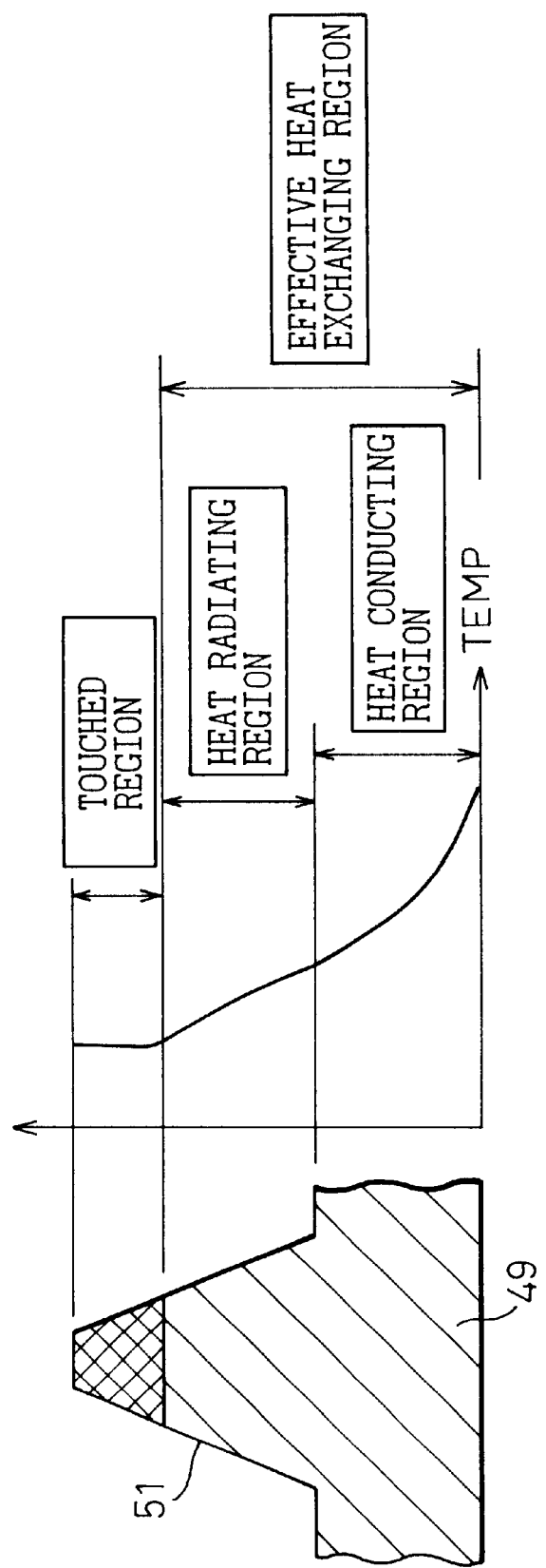
FIG. 7 is an enlarged view showing a primary portion of the outside panel shown in FIG. 6.

Other portions of the outside panel 49 are not subjected to heat insulation treatment, that is, other portions of the outside panel 49 are left, as they are, made of material of high heat conductivity. Therefore, other portions of the outside panel 49 can function as a heat radiating region and a heat transmitting region which are effectively used for heat exchange (shown in FIG. 7).

Since the contact area with respect to an operator is small in the third embodiment, the touched region, which is formed at the forward end portion of each protrusion 51 of the outside panel 49 and subjected to heat insulation treatment, acts in such a manner that heat is seldom conducted to the operator. That is, it is possible to decrease the apparent temperature of the outside panel 49. Due to the foregoing, it is possible for an operator to operate the electronic device comfortably.

The profile of the protrusion 51 is not limited to the circular truncated cone shown in the drawing. The profile of the protrusion 51 may be formed into a prism or a circular cylinder.

Fourth Embodiment

Figure 8:
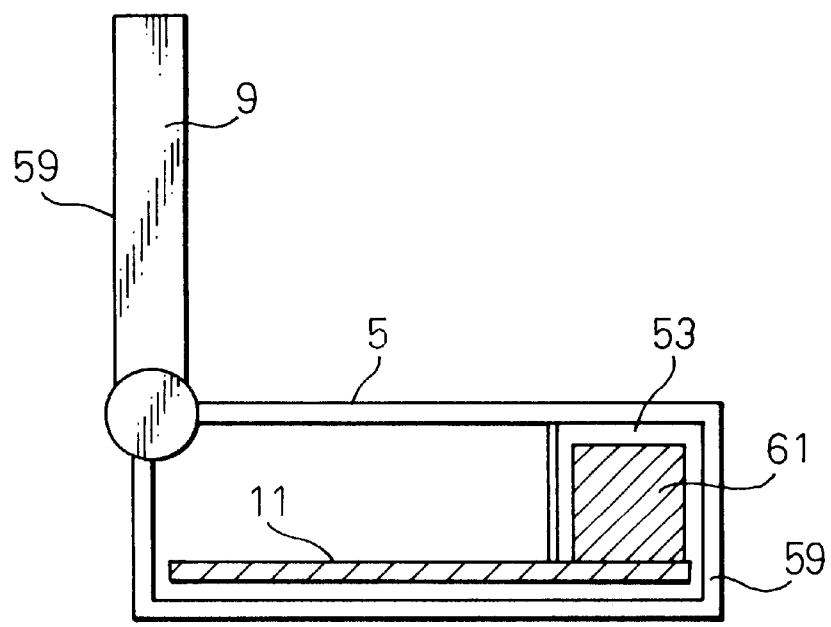
FIG. 8 is a cross-sectional side view of the electronic device of the fourth embodiment of the present invention.

Reference is made to FIG. 8 showing the fourth embodiment. There is provided at least one high temperature zone 53 in the main body 5 of the electronic device shown in the drawing. In FIG. 8, there is provided one high temperature zone 53 on the right of the main body 5.

The high temperature zone 53 is arranged at a position in the main body 5 corresponding to a portion of the outside panel 59 with which it is difficult for an operator's hand or a portion of his body to come into contact. In FIG. 8, the high temperature zone 53 is arranged at a position in the front portion of the main body 5. Heat generating parts 61 are intensively mounted in the high temperature zone 53. In order to prevent the deterioration caused by heat, these heat generating parts 61 are provided with high heat-resistance.

In the fourth embodiment, the temperature of the outer surface of the outside panel 59, which is easily contacted with an operator's hand, is lower than the temperature of the portion of the outside panel 59 (corresponding to the high temperature zone) which can not be easily contacted by the operator's hand. That is, it is possible to decrease the apparent temperature of the outside panel 59. Due to the foregoing, it is possible for an operator to operate the electronic device comfortably.

In this connection, concerning the high heat generating parts which can not be mounted in the high temperature zone 53, it is possible to adopt an arrangement in which heat generated by the heat generating parts is conducted to the high temperature zone 53 via a heat pipe so that it can be discharged outside. In order to prevent heat from being transmitted from the high temperature zone 53 to the outside panel 69, it is possible to adopt an arrangement in which the outer circumference of the high temperature zone is covered with a predetermined heat insulation member.

Fifth Embodiment

Figure 9:
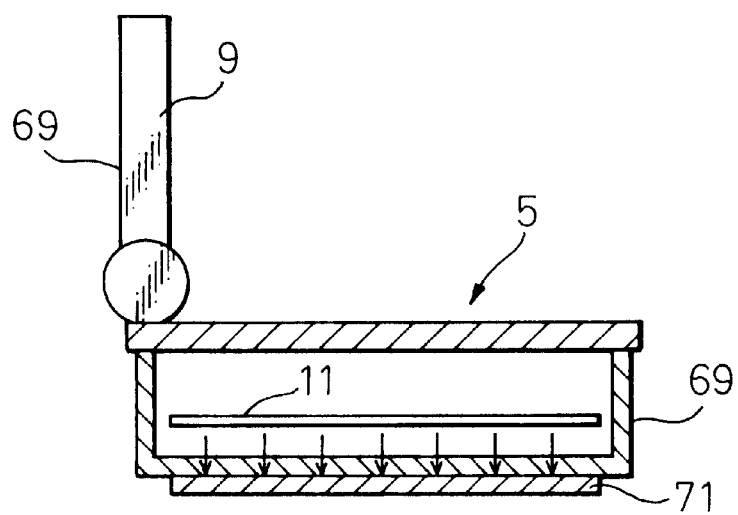
FIG. 9 is a cross-sectional side view of the electronic device of the fifth embodiment of the present invention.

Reference is made to FIG. 9 showing the fifth embodiment. The outside panel 69 of the electronic device shown in the drawing is substantially made of material of high heat conductivity.

In the bottom surface portion of the outside panel 69, there is provided a heat insulating layer 71 made of a felt sheet.

Because of the two layer type outside panel (the outside panel 69 and the heat insulating layer 71), and especially because of the heat insulating layer, for example, when this electronic device is operated on the knees of an operator, it is possible for the operator to operate the electronic device comfortably without feeling heat generated by the electronic device.

In this connection, the heat insulating layer 71 can be substituted by another arrangement, that is, the heat insulating layer 71 can be substituted by coating an appropriate resin or paint or by metallic vapor deposition.

Of course, the same heat insulating layer may be provided in other portions of the outside panel 69 so that the temperature can be decreased.

Sixth Embodiment

Figure 10:
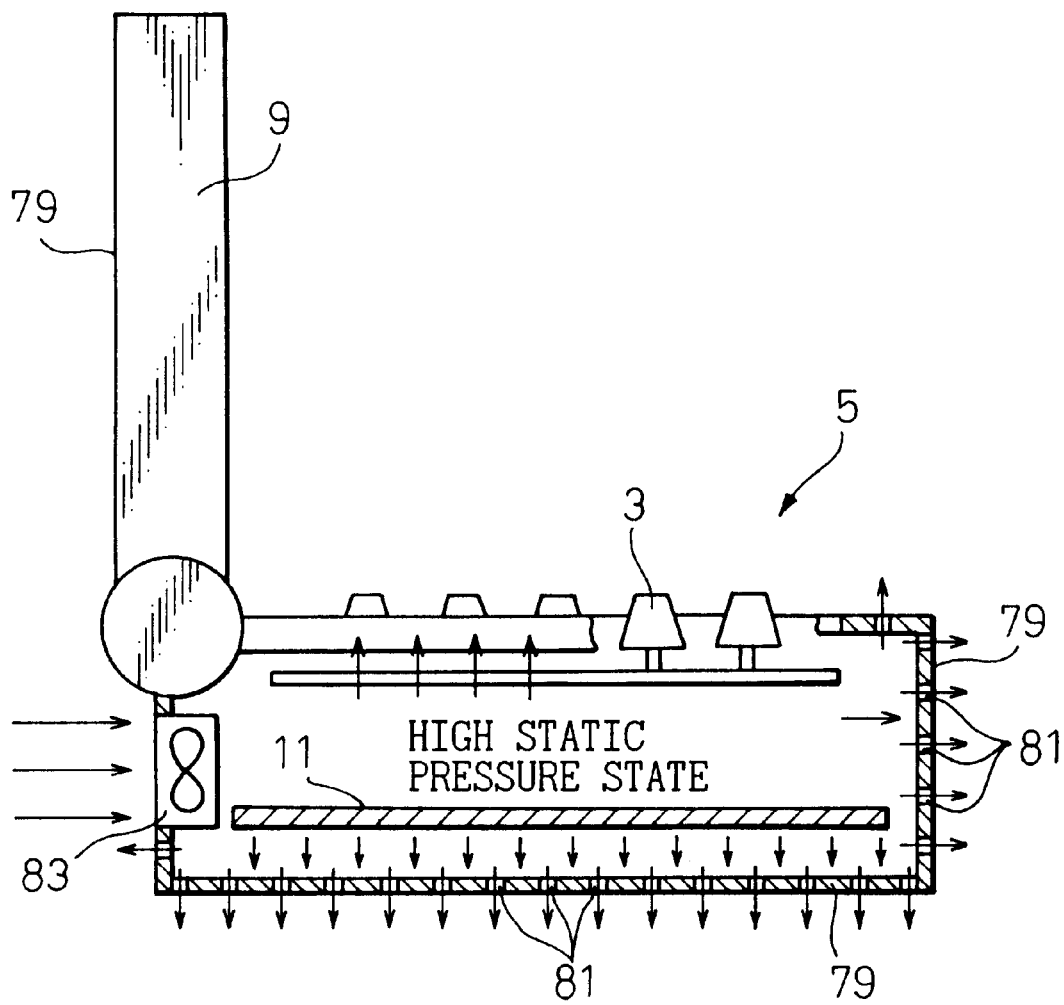
FIG. 10 is a cross-sectional side view of the electronic device of the sixth embodiment of the present invention.

Reference is made to FIG. 10 showing the sixth embodiment. The outside panel 79 of the electronic device shown in the drawing is substantially made of material of high heat conductivity. The outside panel 79 is provided with a plurality of holes 81.

The pressure generating unit 83 such as a fan or blower is attached at the rear of the main body 5. This pressure generating unit 83 sends air inside the main body 5. Accordingly, pressure in the main body 5 is increased, that is, the inside of the main body 5 is put into a state of positive pressure, and air inside the main body 5 is jetted out from the holes 81 formed on the outside panel 79. The diameter and the number of the holes 81 are appropriately determined according to the capacity and the cooling efficiency of the pressure generating unit 83.

When air in the main body 5 is jetted out, it is possible to decrease the apparent temperature of the outside panel 79. Due to the foregoing, it is possible for an operator to operate the electronic device comfortably.

As described above, according to the present invention, it is possible to decrease the surface temperature of the outside panel. Therefore, the apparent temperature of the outside panel can be decreased. Due to the foregoing, an operation performed by an operator is not affected by the heat generated in the electronic device, and an inconvenience caused by the heat generated by the main body of the electronic device can be reduced or eliminated.

It is to be understood that the invention is by no means limited to the specific embodiments illustrated and described herein, and that various modifications thereof may be made which come within the scope of the present invention as defined in the appended claims.

What is claimed is:

1. An electronic device, such as a notebook computer, an outside panel constructed of a single member body formed of high heat conduction resin material whose interior includes a plurality of integrally formed, parallelly disposed structural members which cooperate to form a plurality of independent, linearly elongated, regularly arranged, closed parallel sealed spaces formed within said body, said closed spaces having a contained gas to provide thermal insulation in said outside panel.

\* \* \* \* \*